(12) United States Patent
Slater et al.

(10) Patent No.: US 10,149,098 B2
(45) Date of Patent: Dec. 4, 2018

(54) LOCATION TRACKING

(71) Applicant: Accenture Global Solutions Limited, Dublin (IE)

(72) Inventors: Mark Slater, Hertfordshire (GB); John Roe, Cambridge (GB); Kari Juhani Kuisma, Lempäälä (FI); Andrew Jordan, Oxted (GB); John J. Chooracken, Cambridge (GB); Philip Vann, Oxfordshire (GB)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 15/906,830

(22) Filed: Feb. 27, 2018

(65) Prior Publication Data

US 2018/0255427 A1 Sep. 6, 2018

Related U.S. Application Data (63) Continuation of application No. 15/438,171, filed on Feb. 21, 2017, now Pat. No. 9,913,085.

(60) Provisional application No. 62/297,521, filed on Feb. 19, 2016.

(51) Int. Cl.
*H04W 4/02* (2018.01)
*H04W 40/24* (2009.01)
*H04L 12/24* (2006.01)
*H04W 4/021* (2018.01)

(52) U.S. Cl.
CPC ......... *H04W 4/021* (2013.01); *H04W 40/244* (2013.01); *H04L 41/22* (2013.01)

(58) Field of Classification Search
CPC ...... H04W 4/021; H04W 40/244; H04L 41/22
See application file for complete search history.

(56) References Cited

U.S. PATENT DOCUMENTS

| | | |
|---|---|---|
| 6,776,334 B1 | 8/2004 | Garg |
| 9,269,197 B2 | 2/2016 | Haperen et al. |
| 9,721,152 B1 | 8/2017 | Kolin |
| 9,913,085 B2 * | 3/2018 | Slater .................... H04W 4/021 |
| 2006/0087474 A1 | 4/2006 | Do et al. |
| 2006/0290519 A1 * | 12/2006 | Boate .................. G07C 9/00111 |
| | | 340/573.4 |
| 2007/0290924 A1 | 12/2007 | McCoy |
| 2008/0167896 A1 | 7/2008 | Fast et al. |

(Continued)

*Primary Examiner* — Brandon J Miller
(74) *Attorney, Agent, or Firm* — Fish & Richardson P.C.

(57) ABSTRACT

Methods, systems, and apparatus, including computer programs encoded on a computer storage medium, for location tracking are disclosed. In one aspect, a method includes the actions of receiving, from a computing device that is configured to receive radio signals from beacons, beacon data that includes data identifying a corresponding beacon and data identifying a power level of a corresponding radio signal. The actions further include receiving, from the computing device, sensor data collected by a sensor that is located on the computing device. The actions further include based on the beacon data, determining a location of the corresponding beacon. The actions further include based on the sensor data, adjusting the location of the corresponding beacon. The actions further include generating a user interface that identifies the corresponding beacon and the adjusted location. The actions further include providing, for output, the user interface.

20 Claims, 7 Drawing Sheets

(56) References Cited

U.S. PATENT DOCUMENTS

| | | | |
|---|---|---|---|
| 2013/0132271 A1* | 5/2013 | Daniel | G06F 21/10 |
| | | | 705/39 |
| 2015/0072618 A1* | 3/2015 | Granbery | H04W 4/21 |
| | | | 455/41.2 |
| 2015/0110259 A1* | 4/2015 | Kaye | H04W 4/80 |
| | | | 379/202.01 |
| 2015/0287045 A1 | 10/2015 | Brown et al. | |
| 2016/0007315 A1* | 1/2016 | Lundgreen | G01S 3/46 |
| | | | 455/67.11 |
| 2016/0098914 A1 | 4/2016 | Melton et al. | |
| 2016/0260296 A1* | 9/2016 | Shirriff | G08B 5/22 |
| 2017/0039516 A1 | 2/2017 | Amann | |
| 2017/0079001 A1* | 3/2017 | Lewis | H04W 64/00 |
| 2017/0118446 A1 | 4/2017 | Lee et al. | |

* cited by examiner

LOCATION TRACKING

CROSS-REFERENCE TO RELATED APPLICATIONS

This application is a continuation (and claims the benefit of priority under 35 USC 120) of Ser. No. 15/438,171, filed Feb. 21, 2017, which claims the benefit of U.S. Provisional Application Ser. No. 62/297,521, filed Feb. 19, 2016. Both of these prior applications are incorporated by reference in their entirety.

TECHNICAL FIELD

This disclosure generally relates to location tracking.

BACKGROUND

Conferences include different events such as meetings, presentations, panel discussions, and demonstrations. Conference attendees are typically free to move around the conference to attend the events and visit booths that interest them. In between events, the conference attendees may eat food provided by the conference organizer, use the restroom, or relax in a breakroom.

SUMMARY

During a conference, attendees may check in at a welcome desk, move around a conference floor that may include various booths, attend presentations in separate rooms, eat in other rooms, or catch up on work in other designated spaces. Conference organizers plan a conference layout moving around the conference is as smooth as possible. Organizers want to avoid attendees congregating at a location where there may not be enough services to provide for them, such as a lack of internet bandwidth or adequate temperature control. To keep track of attendees, organizers may provide each of the attendees with a radio beacon that transmits a unique identifier at various intervals. The organizers may place receivers around the conference to receive signals from the radio beacons. The receivers transmit reception times and signal strength levels for each of the radio beacon transmissions to the cloud. Organizers can access the radio beacon data and perform analytics on the data. For example, the organizers can determine if a particular room is overcrowded or if an overcrowded event is about to end before lunch which might cause an unusually large number of people to eat at a nearby foodservice station. In this instance, the organizers can, in real-time, direct services to the locations of the conference where they are needed. For future conferences, the organizers may use the radio beacon data to design conference layouts so that each portion of the conference is well utilized.

An innovative aspect of the subject matter described in this specification may be implemented in a method that includes the actions of receiving, from a computing device that is configured to receive radio signals from beacons, beacon data that includes data identifying a corresponding beacon and data identifying a power level of a corresponding radio signal; receiving, from the computing device, sensor data collected by a sensor that is located on the computing device; based on the beacon data, determining a location of the corresponding beacon; based on the sensor data, adjusting the location of the corresponding beacon; generating a user interface that identifies the corresponding beacon and the adjusted location; and providing, for output, the user interface.

These and other implementations can each optionally include one or more of the following features. The action of adjusting the location of the corresponding beacon includes determining, based on the sensor data, confidence score that indicates a likelihood that a person who corresponds to the beacon is in a different location than the unadjusted location; and based on the confidence score, adjusting the location of the corresponding beacon. The sensor data includes temperature data, ultrasound data, image data, audio data, gyroscope data, accelerometer data, infrared data, cellular data, motion data, oxygen saturation data, air flow data, or wi-fi data. The sensor data is collected by the computing device at a same time that the computing device receives the corresponding radio signal. The actions further include based on the adjusted location of the corresponding beacon, providing, to a computing device that controls a service provided to a person who corresponds to the beacon, an instruction to adjust the service. The service comprises lighting, HVAC, or network bandwidth. The actions further include determining that the adjusted location is within a geofence; and based on determining that the adjusted location is within the geofence, providing, for output, data indicating that the adjusted location is within the geofence.

Other implementations of this aspect include corresponding systems, apparatus, and computer programs recorded on computer storage devices, each configured to perform the operations of the methods.

Particular implementations of the subject matter described in this specification can be implemented so as to realize one or more of the following advantages. A system may be able to track locations of conference attendees using radio signals and sensor data which may provide improved location accuracy over just radio signals. The system may be able to identify when beacons cross a geofence. A system can locate, in real-time, locations of conference attendees.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
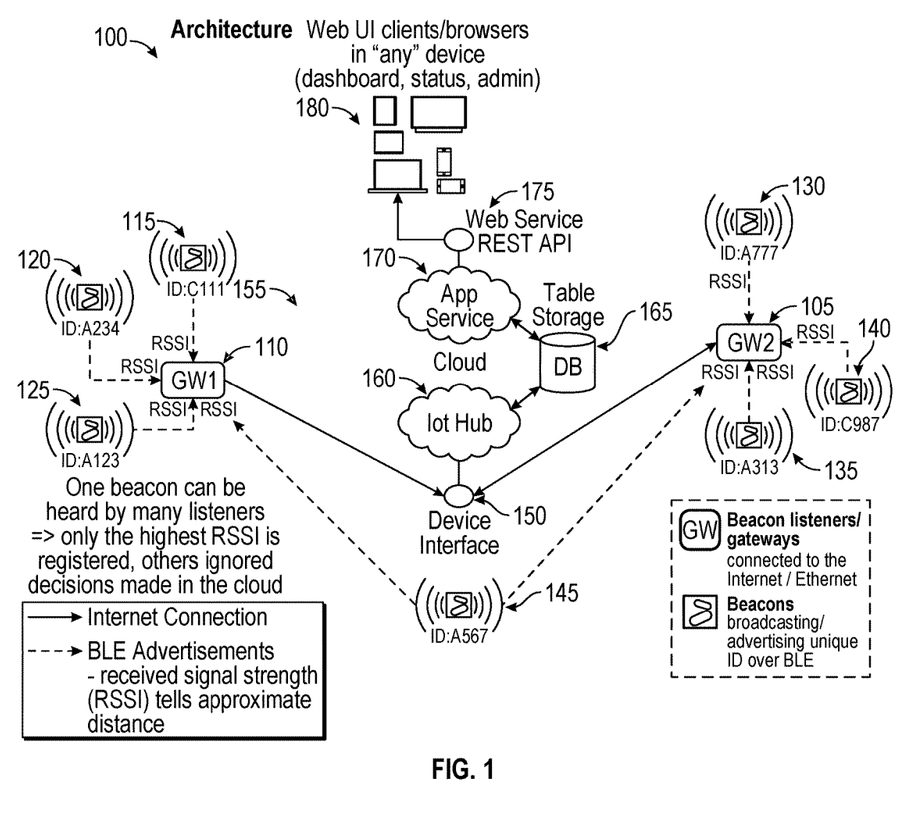
FIG. 1 illustrates an example architecture for receiving and processing radio beacon transmissions.

FIG. 1 illustrates an example architecture 100 for receiving and processing radio beacon transmissions. Briefly, and as described in further detail below, the architecture 100 consists of a series of radio receivers 105 and 110 that receive radio transmissions from radio beacons 115, 120, 125, 130, 135, 140, and 145. The radio receivers 105 and 110 communicate data associated with the transmissions to an interface device 150. The interface device 150 provides the data to devices in the cloud that perform analytics on the data.

In the context of a conference, the conference organizer may provide each one of the attendees with a radio beacon. The radio beacon may be embedded into a badge provided to the attendees. Each radio beacon may be specifically associated with an attendee. For example, radio beacon 120 may be embedded in Alice's badge. Radio beacon 145 may be attached to Bob's badge. The radio beacons are configured to transmit, over a radio signal, unique information that identifies the particular beacon. For example, radio beacon 120 transmits A234. Radio beacon 145 transmits A567. The radio beacons may be configured to transmit the unique information at periodic intervals such as every thirty seconds or every minute. In some implementations, the radio beacons may be configured to begin transmitting upon activation. For example, a radio beacon may be activated by turning on the radio beacon or when the radio beacon receives a wake up signal that may be transmitted throughout the conference facility. In some implementations, each radio beacon may be configured to transmit different power levels. For example, radio beacon 145 may be configured to transmit at ten milliwatts of power. Radio beacon 120 may be configured to transmit at fifty milliwatts of power. In the case where radio beacon 120 and radio beacon 145 both have similar batteries, the battery of radio beacon 145 may last longer assuming that both radio beacons transmit at the same interval.

Each radio beacon may transmit a radio signal using a low power radio technology such a Bluetooth low energy. The receivers 110 and 115 are configured to detect each signal as well as detect a strength of each received signal. In some implementations, the receivers 110 and 115 may include multiple antennas so that each receiver may identify a directionality of the received signal. Receivers 110 and 115 may determine a directionality of the signal by comparing, for each radio signal, reception times and reception powers of each antenna. In some implementations, the receivers 110 and 115 may not be configured with multiple antennas and instead may be configured with only one antenna, or only one antenna per radio module, that is configured receive data from the beacons. In this instance, directionally of received signals is not considered by the system 100. In some implementations, the receivers 110 and 115 may be unable to determine directionality of the signal using multiple antennas. In this instance, the receivers 110 and 115 may include locator devices that are configured to determine an angle of arrival of a received signal.

At periodic intervals, the receivers 110 and 115 transmit data associated with the received signals to the interface device 150. The receivers may transmit data, for each radio signal, a signal strength and a reception time. For receivers with multiple antennas, the receiver may transmit, for each radio signal and for each antenna, a signal strength and a reception time. During set up of the receivers 110 and 115, each receiver may transmit its location to the interface device 150 as well as the orientation of each receiver's multiple antennas, if any. Alternatively, the conference organizers who set up the receivers may program the receiver locations into the interface device 150. In some implementations, receivers 110 and 115 are configured to scan for signals from radio beacons at periodic intervals. For example, each radio beacon may be configured to transmit once per second. The receivers 110 and 115 may scan every six hundred milliseconds. In this instance, the receivers 110 and 115 may be configured to transmit the collected radio beacon data to the cloud 115 every ten seconds.

The interface device 150 provides the received signal strengths, reception times, and receiver locations to the cloud 155. The cloud may include an internet of things hub 160 that receives the data from the interface device 150 and stores the data in the table storage 165. The cloud 155 may analyze the data stored in the table storage 165 to identify locations and movement of each radio beacon and its corresponding conference attendee. The cloud 155 determines locations of users based on signal strength. The stronger a signal, then the closer an attendee is to a receiver. The cloud 155 may also compare the signal strengths and reception times for each antenna of a receiver to identify a likely orientation of the attendee with respect to the receiver. In some instances, multiple receivers may receive the same radio beacon signal. When this happens, the cloud 155 can ignore all receptions except for the one with the highest signal strength. With distance from receiver and orientation with respect to the receiver, the cloud 155 may store in the table storage 165 a vector that includes the beacon identifier, the receiver location, the orientation, the distance from the receiver and the time. The cloud 155 may also generate a movement path for each attendee based on the stored vectors.

In some implementations, different beacons may be configured to transmit at different power levels. In this instance, the cloud 155 may also factor in the transmission power of each beacon. For example, radio beacon 145 may be configured to transmit at ten milliwatts, and radio beacon 120 may be configured to transmit at fifty milliwatts. The cloud 155 may consider the power lost from the original transmission power when computing how far a radio beacon is from a receiver.

The cloud 155 may also perform various analytics using the location vectors and the movement paths. For example, the cloud 155 may determine a number of attendees in a particular room where a receiver is located. The cloud 155 may be able to provide organizers with the ability to locate a particular attendee by locating the attendee's radio beacon. The cloud 155 may be able to direct particular services to the locations where attendees may be congregating. For example, an organizer may be able to move some catering services to a particular section of a conference if that section appears to be more crowded than expected before lunch. After the event is over, the cloud 155 provides the organizers with locations that were popular with attendees as well as locations that were less popular. The organizers may view movement patterns to identify popular paths where attendees walked. In the future, organizers may choose to spread out popular locations and place booths or other advertisements along popular paths.

In some implementations, each radio beacon may include an indicator that the organizers can activate by transmitting a signal through the receivers. The indicator may be an LED that activates when the radio beacon receives the signal. The organizers may use the LED to notify users when presentations or events are about to end. In some instances, the organizers may target radio beacons in a particular room or location by only transmitting the notification to a particular receiver. In some implementations, the organizers may be able to target an indicator of a specific radio beacon by transmitting the identifier for that radio beacon.

The organizers may interact and consume the data in the cloud 155 my using a client device 180. The client device interfaces with a web service API 175 and the app service 170 that accesses data stored in the cloud 155 and the table storage 165. The organizers may request that the cloud 155 perform particular analytics on the data such as identify movement paths for a particular attendee or identify a popular restroom.

In some implementations, the beacons may be configured to transmit only. The beacons may not be able to receive data from the receivers 110 and 115. To configure the beacons for bi-directional communication, or "connected" mode of Bluetooth low energy, the beacons may be configured during normal operations, such as during a conference. In some implementations, beacons are configured before beginning normal operations or during a provisioning phase.

Figure 2:
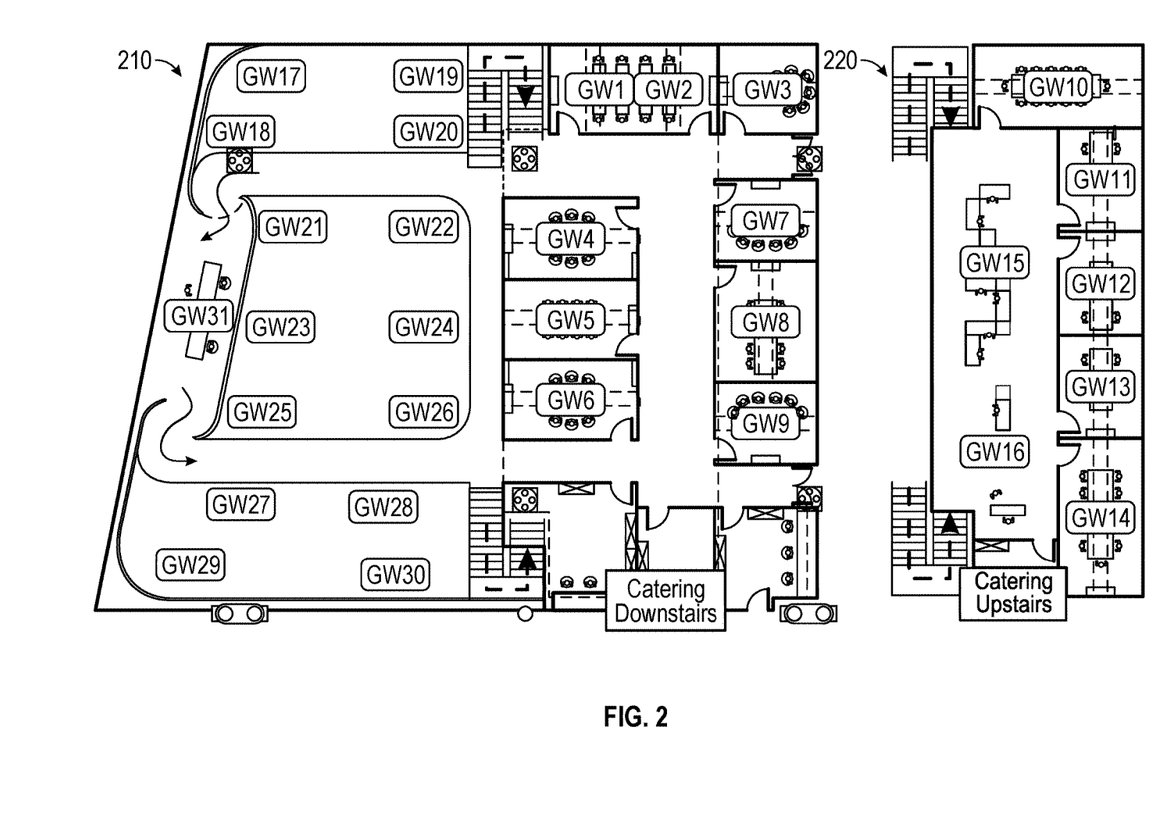
FIG. 2 illustrates an example conference floor plan with locations of radio beacon receivers.

FIG. 2 illustrates an example conference floor plan 200 with radio beacon receivers. The floor plan 200 includes a first floor 210 and a second floor 220. The first floor 210 includes receivers that are located in room and receivers that are located in an open floor. Similarly, the second floor 220 includes receives in rooms and in an open floor. When placing the receivers, an organizer may consider obstacles that may impede radio signals, such as walls. Therefore, it may be helpful to include a receiver in each room. Organizers may also provide training data to the system that may assist the cloud in identifying locations of different beacons. For example, an organizer may move around floor 210 and record his location manually while also carrying a radio beacon. The radio beacon may transmit normally as the organizer moves around the floor 210 and floor 220. Once the organizer has traveled the floors, the organizer may input the known location data that the organizer recorded to the cloud 155. The cloud may then compare the known location data to the determined location data and adjust any calculations as needed.

In some implementations, the floor plan is provided to the cloud 155. Because the floor plan identifies walls, the cloud 155 may identify locations where signals may be blocked. With this information the cloud 155 may be able to identify and correct location vectors that may be unlikely such as a user's path indicating that he walked through a wall, or a vector that indicated a user is outside a room when the associated radio transmission would require the signal to travel through a wall.

The floor plan 200 may also include information relates to different services that may be provided by the conference. For example, the floor plan 200 may indicate vents where HVAC is provided to each room. The floor plan 200 may include data related to the lighting fixtures in each room. Additionally, the floor plan 200 may include data related to where each wifi access point is located.

Figure 3:
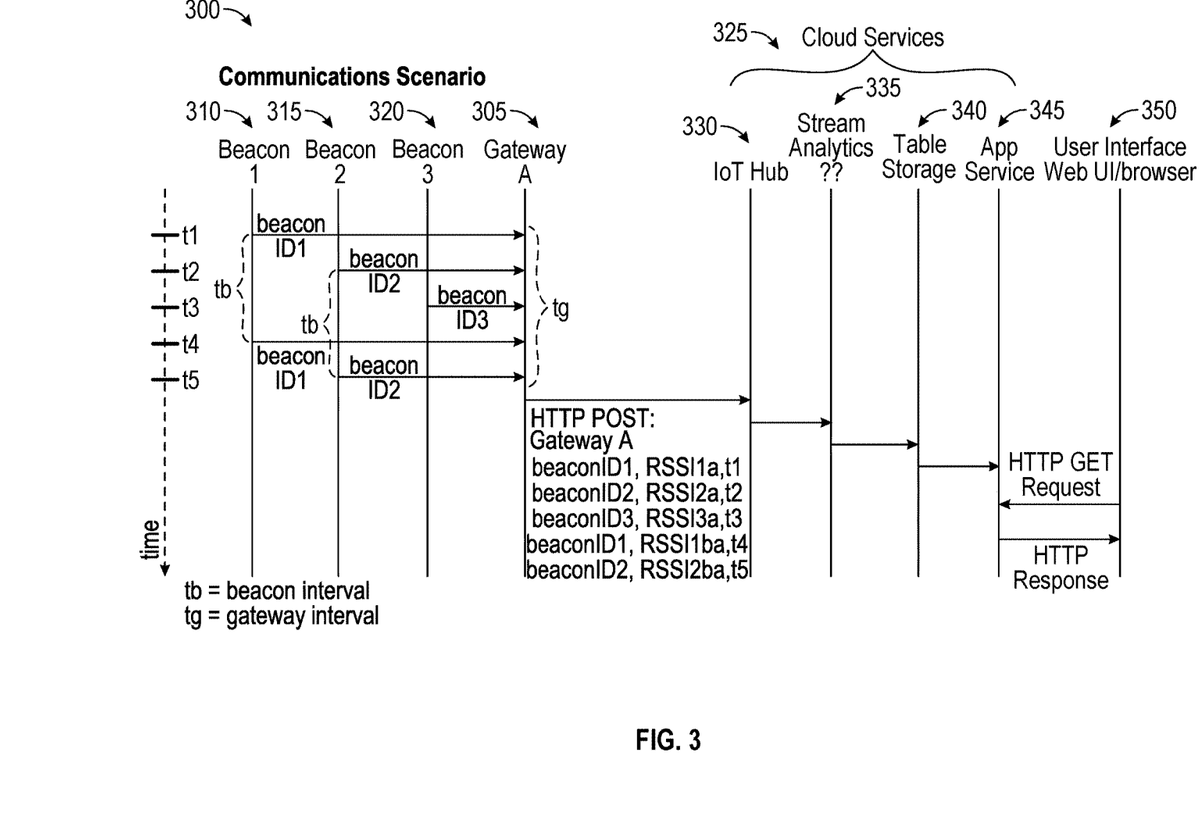
FIG. 3 illustrates example radio beacon transmissions and associated time lines.

FIG. 3 illustrates example communications scenario 300 with radio beacon transmissions and associated time lines. The communications scenario 300 involves a receiver 305 and beacons 310, 315, and 320. The receiver 300 receives two transmissions at times t1 and t4 from beacon 310 that are separated by a time tb, two transmissions at time t2 and t5 from beacon 315 that are separated by the time tb, and one transmission at time t3 from beacon 320. Upon a request from the cloud 325, the receiver 300 provides the beacon identifiers, received signal strength, and reception times for each transmission. In some implementations, the receiver 300 provides the cloud 325 with the reception data through an HTTP POST request.

The cloud 325 may process the reception data through the internet of things hub 330, the stream analytics device 335, the table storage 340, and the app server 345. Each of these devices has functionality similar to that which was described above with respect to FIG. 1. The stream analytics device 335 may be the device that performs the analytics on the beacon data. The user may access the data as well as request particular analytics through the user interface 350 running on a user device. The user interface 350 communicates with the cloud suing HTTP GET requests and responses.

Figure 4:
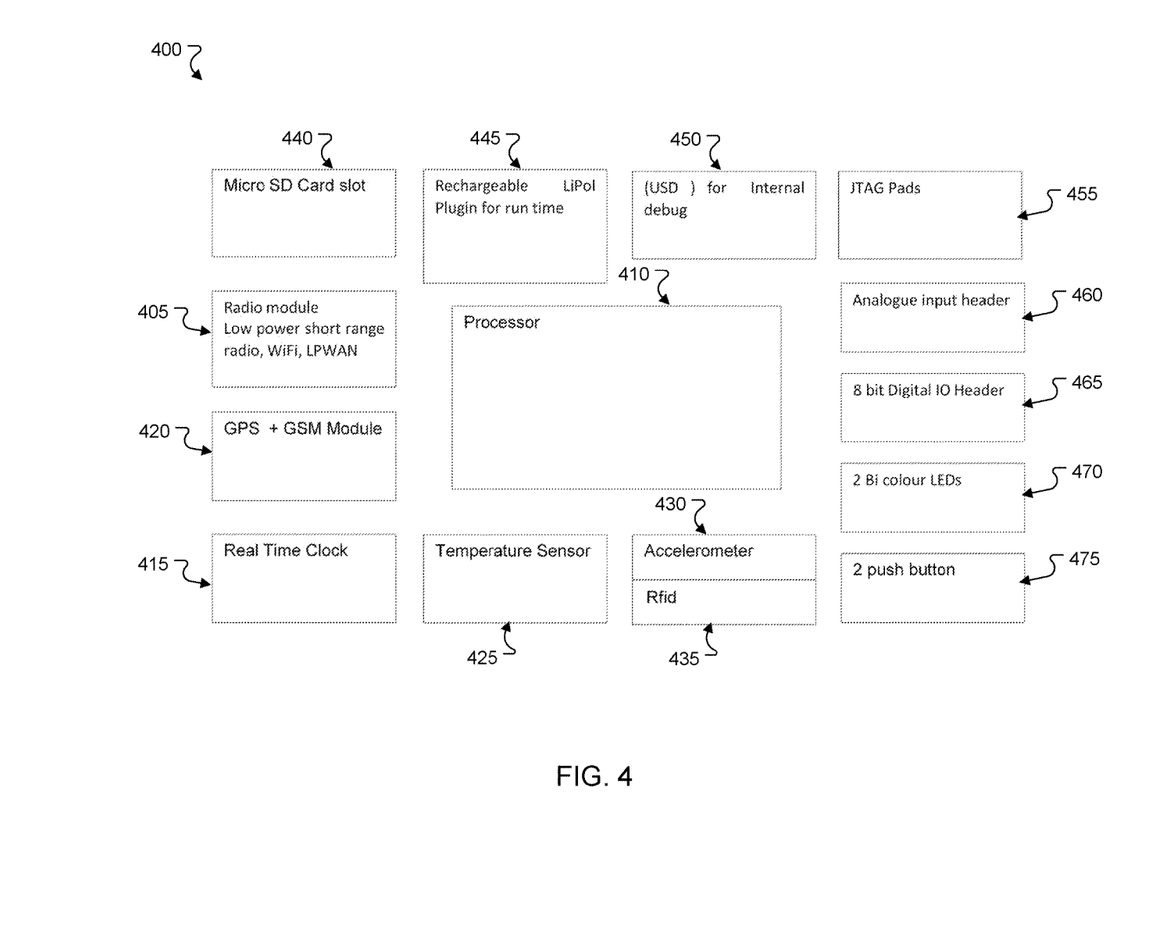
FIG. 4 illustrates an example system for receiving and processing radio beacon transmissions.

FIG. 4 illustrates an example receiver 400 that receives and processes radio beacon transmissions. The receiver 400 may be used in place of the receivers in FIGS. 1-3. The receiver 400 may include various sensors to collect data that the receiver 400 or computing devices in the cloud process to determine locations and movements of radio beacons and the people carrying the radio beacons. The receiver 400 may be an Internet of Things (IoT) connected device that aids in quick prototyping of connected operations, spaces, transport, health, and commerce use cases.

The receiver 400 includes a radio module 405. The radio module 405 include one or more antenna that are connected to one or more front end signal processing modules. The radio module 405 may be configured to receive, and possibly transmit, using a low power radio transmission, such as Bluetooth low energy (Bluetooth Smart) or Bluetooth. The antennas of the radio module 405 may be located around the perimeter of the receiver 400. For example, each corner of the receiver 400 may include an antenna that is configured to receive, and possible transmit, a lower power radio signal. In some implementations, the radio module 405 includes only one antenna. Each antenna may include its own front end processing module or the antennas may provide the signal to a shared front end processing module that processes the received radio signals in parallel. The radio modules 405 are also configured to detect the power of incoming radio signals. Each antenna may detect a radio signal at different power levels and this information is provided to the processor 410 along with the processed radio signals. In some implementations, the radio module 405 also includes a Wi-Fi module and a LPWAN module. The Wi-Fi module is configured to wirelessly communicate over a local area wireless network with other devices over a Wi-Fi connection, for example, a SIGFOX module. The LPWAN module is configured to provide wireless communication capabilities with other connected objects, or Internet of Things objects. As an example, the LPWAN module may be a LoRa module. In some implementations, the Wi-Fi module and LPWAN module may be separate and each have their own antennas, and in other implementations, the Wi-Fi module and LPWAN module may be combined.

The receiver 400 includes a real time clock 415. The real time clock 415 is configured to maintain the accurate time and date. The real time clock 415 may be programmed manually or through radio signals transmitted from a central clock. The real time clock 415 may include an antenna to communicate with the central clock. Alternatively, the real time clock 415 may receive the time from the GPS and GSM module 420. The processor 410 may access the real time click 415 to timestamp each incoming radio signal for each antenna of the radio module 405.

The GPS and GSM module 420 provides location data to the processor 420. In some implementations, the processor 410 may combine location data to each timestamped radio signal and signal strength data item. In some implementations, the processor 410 may group timestamped radio data and label the data with the collection location. The GPS and GSM module 420 also provides a GSM module that communicates through a GSM network. A conference organizer can use the GSM module to communicate with the receiver 400 to program or receive updates from the receiver 400. As an example, the GPS and GSM module 420 may be a Ublox device.

The receiver 400 includes a temperature sensor 425. The temperature sensor is configured to detect the ambient temperature around the receiver 400. Similar to the GSM data, the processor 410 may combine the temperate data with each timestamped radio signal and signal strength data item. In some implementations, the processor 410 may group timestamped radio data and label the data with a particular temperature. In some implementations, the processor 410 may create a new data item that includes the temperature and a timestamp. The processor 410 may be configured to read the temperature from the temperature sensor 425 at particular intervals that may be programmed by the conference organizers or determined by the processor 410 based on temperature changes. For example, the processor 410 may generate a timestamped temperature data item each time the temperature changes. The temperature change threshold may be programmed by the conference organizers.

The receiver 400 also includes an accelerometer 430. The accelerometer 430 may be used to detect movement of the receiver 400. The processor 400 may receive accelerometer data and combine the accelerometer data with a timestamp each time the accelerometer detects movement. The movement threshold may be programmed by the conference organizers.

The receiver 400 may include other types of sensors and communication modules such as a microphone, photodetector, camera, gyroscope, magnetometer, WiFi module, near-field communication module, motion detectors, barometer, hygrometer, altimeter, air flow detector, oxygen sensor, or any other sensor that may provide information related to the presence of people.

The receiver 400 includes an RFID module 435 to uniquely identify the receiver. The receiver also includes a micro SD card slot 440, a battery 445, a debug module 450, JTAG pads 455, an analog input/output header 460, a digital input/output header 465, LEDs 470, and buttons 475. These devices and the devices described above communicate with the processor 410 through a custom printed circuit board.

In some implementations, the processor 410 may be programmed to process the raw radio beacon data combined with the data from the other sensors to identify locations of the radio beacons and the corresponding people. The processor 410 may perform the actions described above as being performed by the cloud 155.

In some implementations, the receiver 400 may be configured to collect other sensor data at periodic intervals. As noted above, the receiver 400 may include other types of sensors that may provide information related to the presence of people. The receiver 400 may periodically provide the sensor data to the cloud. The sensor data may include timestamp data so that the cloud may correlate the sensor data with the beacon data.

In some implementations, the receiver 400 may include an ultrasound sensor. The ultrasound sensor may be located on the receiver 400 or may be located away from the receiver. For example, the receiver 400 may be located on a ceiling of a room and the ultrasound sensor may be located in a trash can in the same room. The ultrasound sensor may communicate data related to the trash can to the receiver 400. Based on the ultrasound data, the receiver 400 may be able to determine a fullness level of the trash can. If the trash can is full, the receiver 400 may be able to send a request that the trash can be emptied. In some implementations, the receiver 400 may transmit the ultrasound data to the cloud. In this instance, the cloud may receive ultrasound data for several different trash cans and may determine an optimal path for a trash collector to follow based on the fullness levels of different trashcans. For example, trash cans that are the most full may be collected first while trash cans that are less full may not be collected or may be collected at the end of a collection round.

Figure 5:
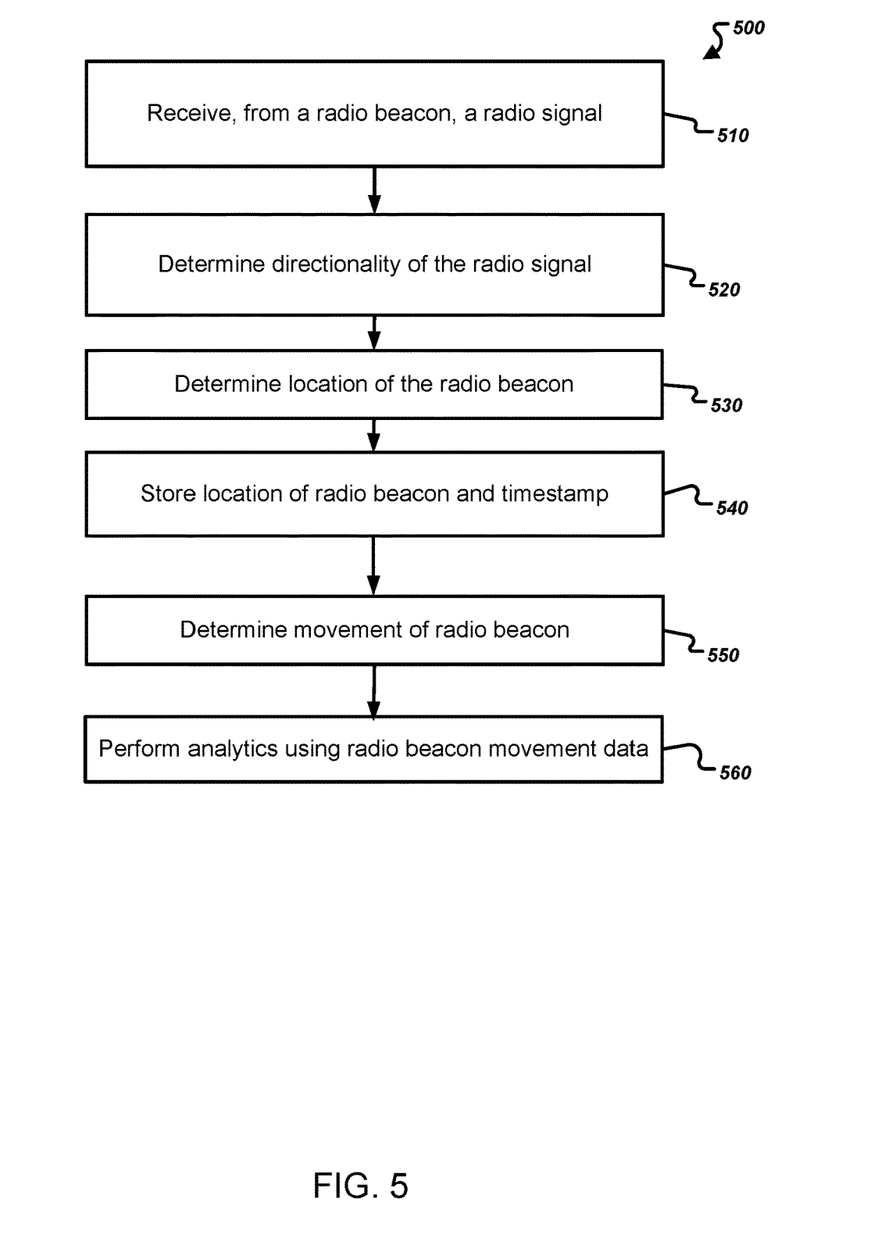
FIGS. 5 and 5A illustrate example processes for analyzing radio beacon data.

FIG. 5 illustrates an example process 500 for analyzing radio beacon data. In general, the process 500 processes radio beacon signals to identify locations and movements of persons associated with the radio beacons. With that information, the process 500 performs various analytics on the data to assist users with identifying patterns of movement and optimizations. The process 500 will be described as being performed by a computer system comprising one or more computers, for example, the systems 155 or 400 as shown in FIG. 1 or 4.

The system receives, from a radio beacon, a radio signal that has a signal strength, and that encodes data identifying the radio beacon (510). The system determines a directionality associated with the radio signal (520). The system determines a location of the radio beacon based on the signal strength and the directionality (530). The system stores the location of the radio beacon in association with a time that the radio signal was received (540). The system determines, based on the location of the radio beacon and on previous locations of the radio beacon, a path and an associated timeline for movements along the path (550). The system performs analytics on the path and the associated timeline for movements along the path (560).

Figure 5A:
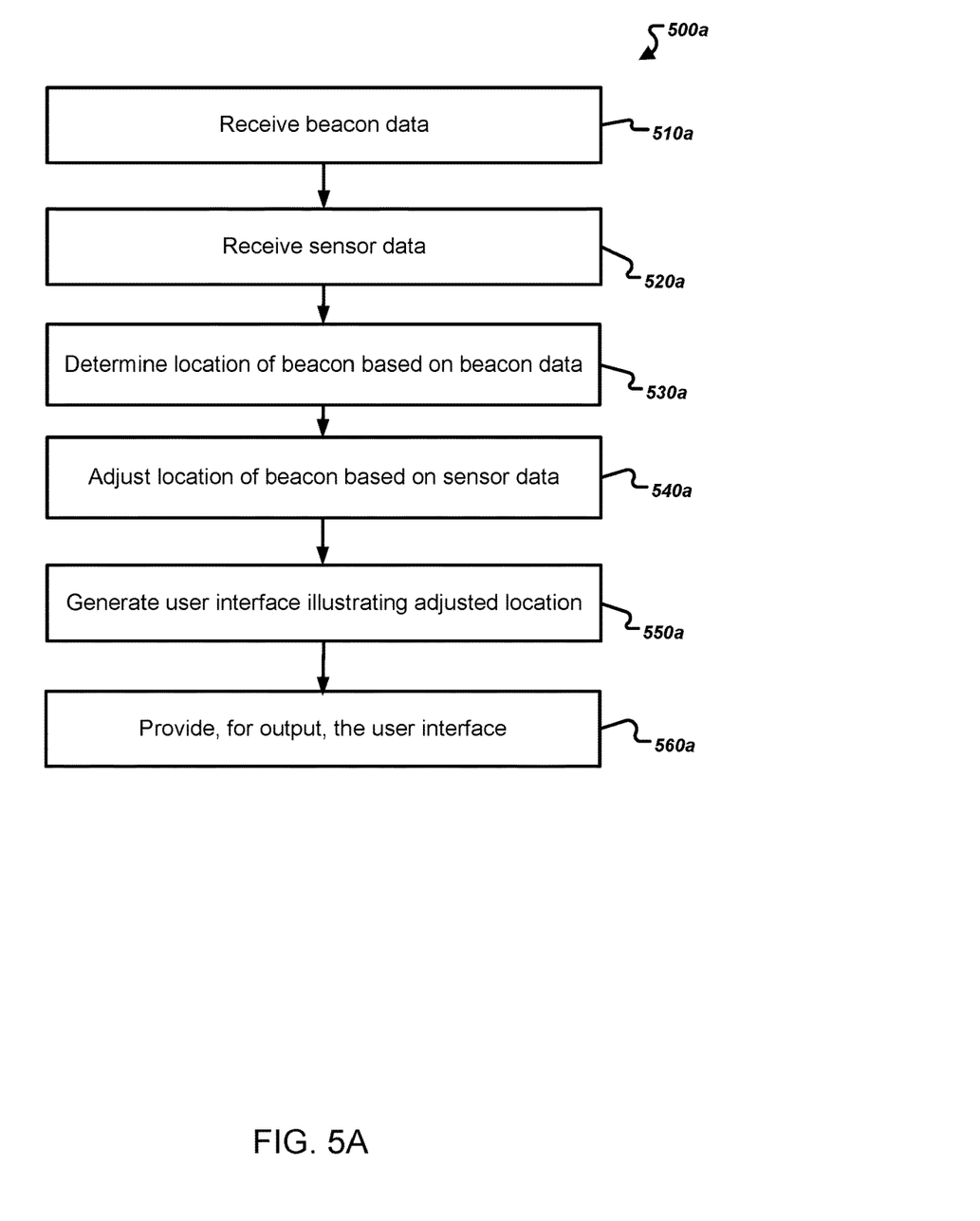

FIG. 5A illustrates an example process 500a for analyzing radio beacon data. In general, the process 500a processes radio beacon signals to identify locations of different radio beacons. The process 500a combines the location data with sensor data collected from the receiver to adjust the locations of the radio beacons. The process 500a will be described as being performed by a computer system comprising one or more computers, for example, the systems 155 or 400 as shown in FIG. 1 or 4.

The system receives, from a computing device that is configured to receive radio signals from beacons, beacon data that includes data identifying a corresponding beacon and data identifying a power level of a corresponding radio signal (510a). In some implementations, the system stores the beacon data along with timestamp data that indicates a time when the computing device received the radio signal. The computing device may be similar to receiver 400 from FIG. 4. The computing device may identify the time when the computing device receives the radio signal and transmit the beacon data and the timestamp to the system.

The system receives, from the computing device, sensor data collected by a sensor that is located on the computing device (520a). In some implementations, the computing device includes sensors that may collect temperature data, ultrasound data, image data, audio data, gyroscope data, accelerometer data, infrared data, cellular data, or wi-fi data. In some implementations, the computing device may collect timestamp the sensor data. In this instance, the system may correlate sensor data with the beacon data using the timestamps The system, based on the beacon data, determines a location of the corresponding beacon (530a). The location may be based on the signal strength of the beacon radio signal, the floorplan where the computing device receiving the radio signal is located, and other computing devices that receive the radio signal. The system may factor in the original transmitting strength of the beacon radio signal in instances where some beacons may be configured to transmit at different power levels. In some implementations, the system may compute a confidence score that indicates a likelihood that the beacon is located at the identified location. For example, the confidence score may be 0.80 where one is the highest confidence score and zero is the lowest confidence score. The confidence score may be based on the signal strength as received by various computing devices and the floorplan. In instances where data from each receiving computing device reflected that the beacon was at a particular location, then the confidence score may increase. In instances where some of the data from each receiving computing device was contradictory, the confidence score may decrease.

The system, based on the sensor data, adjusts the location of the corresponding beacon (540a). The system temperature data, ultrasound data, image data, audio data, gyroscope data, accelerometer data, infrared data, cellular data, or wi-fi data and determine confidence score that indicates a likelihood that one or more people may be nearby. For example, an increase in temperate around a receiving computing device may indicate that numerus people are located near that computing device. Similarly, infrared data may indicate locations of people near the receiving computing device. In instances where people may be near enough to a receiving device to bump into it, the gyroscope data or accelerometer data may reflect the movement of the device. An increase in cellular or wi-fi activity may indicate a concentration of people near a receiving device.

Using the sensor data, the system may compute a confidence score that indicates a likelihood that one or more people may be near the receiving computing device. A confidence score may be higher based on an increased temperature and increased cellular activity. The system may compare the sensor confidence score and the beacon confidence score. In instances where the sensor confidence score is greater than the beacon confidence score, then the system may not adjust the location based on the beacon data. In instances where the sensor confidence score is less than the beacon confidence score, the system may adjust the location based on the sensor data. For example, the sensor data may indicate that about ten people are within fifteen feet of a receiving device. The beacon data may indicate that five people are within twenty feet and five people are between twenty feet and thirty feet. In this instance, the system may adjust some of the locations to be closer to the receiving device. In some implementations, the system may compare the floor plan to the sensor data to determine a likelihood that variations in lighting, walls, or HVAC may be responsible for changes in the sensor data instead of the presence of people.

The system generates a user interface that identifies the corresponding beacon and the adjusted location (550a). The system provides, for output, the user interface (560a). The user interface may include a visualization of the location of the beacons in relation to the floorplan of the conference. The user interface may allow the user to view the time lapse movement of the beacons as well as filter out some beacons based on characteristics of the individuals who have each beacon. In some implementations, the user interface may include graphs and charts that illustrate analytics performed on the beacon data.

In some implementations, the system determines locations of people and adjust services provided for those people. For example, the system may determine that twenty people are in a room that is expected to have ten people. In this case, the temperature sensor may indicate the temperature is rising. The system may instruct the HVAC system to direct cool air to that room. As another example, the system may control a number of wireless access points around a conference floor. In instances where more people than expected are in a particular space, the system may activate any dormant wireless access points to increase bandwidth to the unexpected crowd. The wireless access points may not always be active in order to reduce electricity consumption.

In some implementations, beacons may be attached to an object instead of a person's badge. In this instance, the system is able to track the location of an object. For example, the beacon may be attached to particular audio-video equipment that moves around a conference as needed. With the beacon attached to the equipment, the system is able to locate it.

In some implementations, the system may generate notifications when beacons cross a geofence. For example, a VIP may have a particular beacon. The system may track when the VIP enters and exits a particular room in a conference. When the VIP enters or exits the particular room, the system may generate a notification to a selected device, such as a device belonging to a conference organizer.

Figure 6:
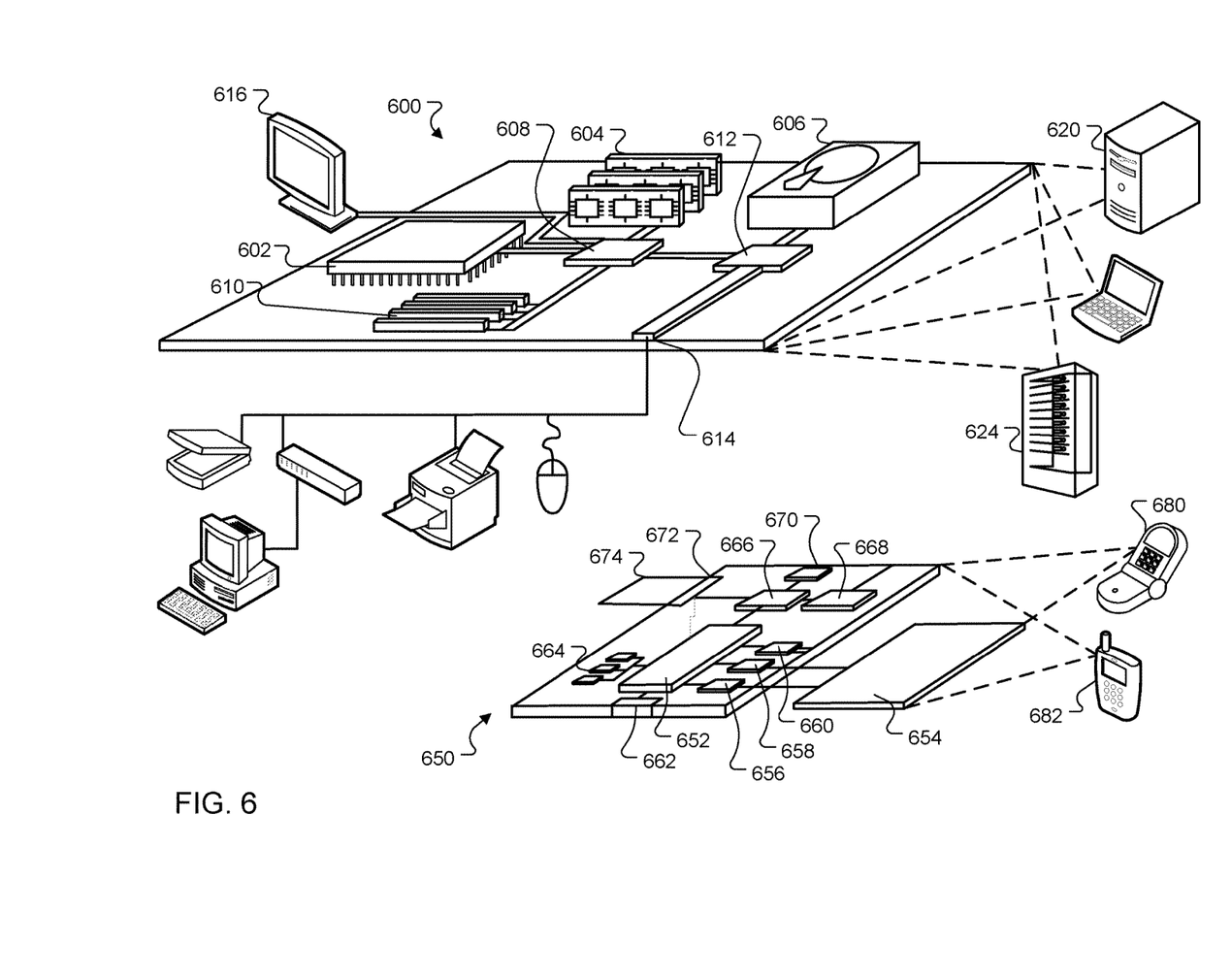
FIG. 6 illustrates an example of a computing device and a mobile computing device.

FIG. 6 shows an example of a computing device 600 and a mobile computing device 650 that can be used to implement the techniques described here. The computing device 600 is intended to represent various forms of digital computers, such as laptops, desktops, workstations, personal digital assistants, servers, blade servers, mainframes, and other appropriate computers. The mobile computing device 650 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 600 includes a processor 602, a memory 604, a storage device 606, a high-speed interface 608 connecting to the memory 604 and multiple high-speed expansion ports 610, and a low-speed interface 612 connecting to a low-speed expansion port 614 and the storage device 606. Each of the processor 602, the memory 604, the storage device 606, the high-speed interface 608, the high-speed expansion ports 610, and the low-speed interface 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as a display 616 coupled to the high-speed interface 608. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 604 stores information within the computing device 600. In some implementations, the memory 604 is a volatile memory unit or units. In some implementations, the memory 604 is a non-volatile memory unit or units. The memory 604 may also be another form of computer-readable medium, such as a magnetic or optical disk.

The storage device 606 is capable of providing mass storage for the computing device 600. In some implementations, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 602), perform one or more methods, such as those described above. The instructions can also be stored by one or more storage devices such as computer- or machine-readable mediums (for example, the memory 604, the storage device 606, or memory on the processor 602).

The high-speed interface 608 manages bandwidth-intensive operations for the computing device 600, while the low-speed interface 612 manages lower bandwidth-intensive operations. Such allocation of functions is an example only. In some implementations, the high-speed interface 608 is coupled to the memory 604, the display 616 (e.g., through a graphics processor or accelerator), and to the high-speed expansion ports 610, which may accept various expansion cards. In the implementation, the low-speed interface 612 is coupled to the storage device 606 and the low-speed expansion port 614. The low-speed expansion port 614, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. In addition, it may be implemented in a personal computer such as a laptop computer 622. It may also be implemented as part of a rack server system 624. Alternatively, components from the computing device 600 may be combined with other components in a mobile device, such as a mobile computing device 650. Each of such devices may contain one or more of the computing device 600 and the mobile computing device 650, and an entire system may be made up of multiple computing devices communicating with each other.

The mobile computing device 650 includes a processor 652, a memory 664, an input/output device such as a display 654, a communication interface 666, and a transceiver 668, among other components. The mobile computing device 650 may also be provided with a storage device, such as a micro-drive or other device, to provide additional storage. Each of the processor 652, the memory 664, the display 654, the communication interface 666, and the transceiver 668, are interconnected using various buses, and several of the components may be mounted on a common motherboard or in other manners as appropriate.

The processor 652 can execute instructions within the mobile computing device 650, including instructions stored in the memory 664. The processor 652 may be implemented as a chipset of chips that include separate and multiple analog and digital processors. The processor 652 may provide, for example, for coordination of the other components of the mobile computing device 650, such as control of user interfaces, applications run by the mobile computing device 650, and wireless communication by the mobile computing device 650.

The processor 652 may communicate with a user through a control interface 658 and a display interface 656 coupled to the display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may provide communication with the processor 652, so as to enable near area communication of the mobile computing device 650 with other devices. The external interface 662 may provide, for example, for wired communication in some implementations, or for wireless communication in other implementations, and multiple interfaces may also be used.

The memory 664 stores information within the mobile computing device 650. The memory 664 can be implemented as one or more of a computer-readable medium or media, a volatile memory unit or units, or a non-volatile memory unit or units. An expansion memory 674 may also be provided and connected to the mobile computing device 650 through an expansion interface 672, which may include, for example, a SIMM (Single In Line Memory Module) card interface. The expansion memory 674 may provide extra storage space for the mobile computing device 650, or may also store applications or other information for the mobile computing device 650. Specifically, the expansion memory 674 may include instructions to carry out or supplement the processes described above, and may include secure information also. Thus, for example, the expansion memory 674 may be provide as a security module for the mobile computing device 650, and may be programmed with instructions that permit secure use of the mobile computing device 650. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 652), perform one or more methods, such as those described above. The instructions can also be stored by one or more storage devices, such as one or more computer- or machine-readable mediums (for example, the memory 664, the expansion memory 674, or memory on the processor 652). In some implementations, the instructions can be received in a propagated signal, for example, over the transceiver 668 or the external interface 662.

The mobile computing device 650 may communicate wirelessly through the communication interface 666, which may include digital signal processing circuitry where necessary. The communication interface 666 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 668 using a radio-frequency. In addition, short-range communication may occur, such as using a Bluetooth, WiFi, or other such transceiver. In addition, a GPS (Global Positioning System) receiver module 670 may provide additional navigation- and location-related wireless data to the mobile computing device 650, which may be used as appropriate by applications running on the mobile computing device 650.

The mobile computing device 650 may also communicate audibly using an audio codec 660, which may receive spoken information from a user and convert it to usable digital information. The audio codec 660 may likewise generate audible sound for a user, such as through a speaker, e.g., in a handset of the mobile computing device 650. Such sound may include sound from voice telephone calls, may include recorded sound (e.g., voice messages, music files, etc.) and may also include sound generated by applications operating on the mobile computing device 650.

The mobile computing device 650 may be implemented in a number of different forms, as shown in the figure. For example, it may be implemented as a cellular telephone 680. It may also be implemented as part of a smart-phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A system, comprising:
   a sensor that is configured to generate sensor data that reflects an environmental condition of a vicinity of the sensor;
   a radio module that is configured to receive beacon signals from one or more radio beacons;
   a processor that is configured to:
      determine a power level and a directionality of each of the beacon signals;
      based on the power level and the directionality of each of the beacon signals, determine a number of people who are likely located in the vicinity of the sensor; and
      based on the sensor data, adjust the number of people who are likely in the vicinity of the sensor; and
   an output module that is configured to output data indicating the adjusted number of people who are likely in the vicinity of the sensor.

2. The system of claim 1, wherein:
   the sensor comprises a thermometer,
   the sensor data that reflects the environmental condition of the vicinity of the sensor comprises a temperature of the vicinity of the sensor, and
   the processor is configured to:
      determine that the temperature of the vicinity of the sensor is greater than an expected temperature of the vicinity of the sensor for the number of people; and
      adjust the number of people who are likely in the vicinity of the sensor based on determining that the temperature of the vicinity of the sensor is greater than an expected temperature of the vicinity of the sensor for the number of people.

3. The system of claim 1, wherein:
   the sensor comprises an accelerometer,
   the sensor data that reflects the environmental condition of the vicinity of the sensor comprises data indicating movement of the accelerometer, and
   the processor is configured to:
      adjust the number of people who are likely in the vicinity of the sensor based on the movement of the accelerometer.

4. The system of claim 1, wherein:
   the sensor comprises a cellular receiver, the sensor data that reflects the environmental condition of the vicinity of the sensor comprises data indicating a level of cellular activity in the vicinity of the sensor, and the processor is configured to:
determine that the level of cellular activity in the vicinity of the sensor is greater than an expected level of cellular activity in the vicinity of the sensor for the number of people; and
adjust the number of people who are likely in the vicinity of the sensor based on determining that the level of cellular activity in the vicinity of the sensor is greater than the expected level of cellular activity in the vicinity of the sensor for the number of people.

5. The system of claim 1, comprising:
an ultrasound device that is configured to transmit ultrasonic audio towards a trash can and detect reflected ultrasonic audio,
wherein the processor is configured to:
based on the transmitted ultrasonic audio and the reflected ultrasonic audio, determine a level of fullness of the trash can; and
based on the level of fullness of the trash can, determine whether the trash can needs to be emptied, and
wherein the output module is configured to transmit a request to empty the trash can based on determining that the trash can needs to be emptied.

6. The system of claim 1, wherein the processor is configured to:
access a floor plan of the vicinity of the sensor;
compare the floor plan of the vicinity of the sensor to the power level and the directionality of each of the beacon signals; and
adjust the number of people who are likely in the vicinity of the sensor based further on the comparison between the floor plan of the vicinity of the sensor and the power level and the directionality of each of the beacon signals.

7. The system of claim 1, wherein the sensor generates the sensor data and the radio module receives the beacon signals at a same time.

8. A computer-implemented method, comprising:
generating, by a sensor of a computing device, sensor data that reflects an environmental condition of a vicinity of the sensor;
receiving, by a radio module of the computing device, beacon signals from one or more radio beacons;
determining, by the computing device, a power level and a directionality of each of the beacon signals;
based on the power level and the directionality of each of the beacon signals, determining, by the computing device, a number of people who are likely located in the vicinity of the sensor;
based on the sensor data, adjusting, by the computing device, the number of people who are likely in the vicinity of the sensor; and
providing, for output by the computing device, data indicating the adjusted number of people who are likely in the vicinity of the sensor.

9. The method of claim 8, wherein:
generating, by the sensor of the computing device, sensor data that reflects an environmental condition of a vicinity of the sensor comprises generating, by a thermometer of the computing device, a temperature of the vicinity of the sensor, and
adjusting, by the computing device, the number of people who are likely in the vicinity of the sensor comprises:
determining that the temperature of the vicinity of the sensor is greater than an expected temperature of the vicinity of the sensor for the number of people; and
adjusting the number of people who are likely in the vicinity of the sensor based on determining that the temperature of the vicinity of the sensor is greater than an expected temperature of the vicinity of the sensor for the number of people.

10. The method of claim 8, wherein:
generating, by the sensor of the computing device, sensor data that reflects an environmental condition of a vicinity of the sensor comprises generating, by an accelerometer of the computing device, data indicating movement of the accelerometer, and
adjusting, by the computing device, the number of people who are likely in the vicinity of the sensor comprises:
adjusting the number of people who are likely in the vicinity of the sensor based on the movement of the accelerometer.

11. The method of claim 8, wherein:
generating, by the sensor of the computing device, sensor data that reflects an environmental condition of a vicinity of the sensor comprises generating, by a cellular receiver of the computing device, data indicating a level of cellular activity in the vicinity of the sensor, and
adjusting, by the computing device, the number of people who are likely in the vicinity of the sensor comprises:
determining that the level of cellular activity in the vicinity of the sensor is greater than an expected level of cellular activity in the vicinity of the sensor for the number of people; and
adjusting the number of people who are likely in the vicinity of the sensor based on determining that the level of cellular activity in the vicinity of the sensor is greater than the expected level of cellular activity in the vicinity of the sensor for the number of people.

12. The method of claim 8, comprising:
transmitting, by an ultrasound device of the computing device, ultrasonic audio towards a trash can;
detecting, by the ultrasound device of the computing device, reflected ultrasonic audio;
based on the transmitted ultrasonic audio and the reflected ultrasonic audio, determining, by the computing device, a level of fullness of the trash can;
based on the level of fullness of the trash can, determining, by the computing device, whether the trash can needs to be emptied; and
based on determining that the trash can needs to be emptied, providing, for output by the computing device, a request to empty the trash can.

13. The method of claim 8, comprising:
accessing, by the computing device, a floor plan of the vicinity of the sensor;
comparing, by the computing device, the floor plan of the vicinity of the sensor to the power level and the directionality of each of the beacon signals; and
adjusting, by the computing device, the number of people who are likely in the vicinity of the sensor based further on the comparison between the floor plan of the vicinity of the sensor and the power level and the directionality of each of the beacon signals.

14. The method of claim 8, wherein the sensor generates the sensor data and the radio module receives the beacon signals at a same time.

15. A non-transitory computer-readable medium storing software comprising instructions executable by one or more computers which, upon such execution, cause the one or more computers to perform operations comprising:
generating, by a sensor of a computing device, sensor data that reflects an environmental condition of a vicinity of the sensor;
receiving, by a radio module of the computing device, beacon signals from one or more radio beacons;
determining, by the computing device, a power level and a directionality of each of the beacon signals;
based on the power level and the directionality of each of the beacon signals, determining, by the computing device, a number of people who are likely located in the vicinity of the sensor;
based on the sensor data, adjusting, by the computing device, the number of people who are likely in the vicinity of the sensor; and
providing, for output by the computing device, data indicating the adjusted number of people who are likely in the vicinity of the sensor.

16. The medium of claim 15, wherein:
generating, by the sensor of the computing device, sensor data that reflects an environmental condition of a vicinity of the sensor comprises generating, by a thermometer of the computing device, a temperature of the vicinity of the sensor, and
adjusting, by the computing device, the number of people who are likely in the vicinity of the sensor comprises:
determining that the temperature of the vicinity of the sensor is greater than an expected temperature of the vicinity of the sensor for the number of people; and
adjusting the number of people who are likely in the vicinity of the sensor based on determining that the temperature of the vicinity of the sensor is greater than an expected temperature of the vicinity of the sensor for the number of people.

17. The medium of claim 15, wherein:
generating, by the sensor of the computing device, sensor data that reflects an environmental condition of a vicinity of the sensor comprises generating, by an accelerometer of the computing device, data indicating movement of the accelerometer, and
adjusting, by the computing device, the number of people who are likely in the vicinity of the sensor comprises:
adjusting the number of people who are likely in the vicinity of the sensor based on the movement of the accelerometer.

18. The medium of claim 15, wherein:
generating, by the sensor of the computing device, sensor data that reflects an environmental condition of a vicinity of the sensor comprises generating, by a cellular receiver of the computing device, data indicating a level of cellular activity in the vicinity of the sensor, and
adjusting, by the computing device, the number of people who are likely in the vicinity of the sensor comprises:
determining that the level of cellular activity in the vicinity of the sensor is greater than an expected level of cellular activity in the vicinity of the sensor for the number of people; and
adjusting the number of people who are likely in the vicinity of the sensor based on determining that the level of cellular activity in the vicinity of the sensor is greater than the expected level of cellular activity in the vicinity of the sensor for the number of people.

19. The medium of claim 15, wherein the operations further comprise:
transmitting, by an ultrasound device of the computing device, ultrasonic audio towards a trash can;
detecting, by the ultrasound device of the computing device, reflected ultrasonic audio;
based on the transmitted ultrasonic audio and the reflected ultrasonic audio, determining, by the computing device, a level of fullness of the trash can;
based on the level of fullness of the trash can, determining, by the computing device, whether the trash can needs to be emptied; and
based on determining that the trash can needs to be emptied, providing, for output by the computing device, a request to empty the trash can.

20. The medium of claim 15, wherein the operations further comprise:
accessing, by the computing device, a floor plan of the vicinity of the sensor;
comparing, by the computing device, the floor plan of the vicinity of the sensor to the power level and the directionality of each of the beacon signals; and
adjusting, by the computing device, the number of people who are likely in the vicinity of the sensor based further on the comparison between the floor plan of the vicinity of the sensor and the power level and the directionality of each of the beacon signals.

* * * * *